(12) United States Patent
Sabri et al.

(10) Patent No.: US 11,047,747 B2
(45) Date of Patent: Jun. 29, 2021

(54) LIGHT WEIGHT FLEXIBLE TEMPERATURE SENSOR KIT

(71) Applicants: Firouzeh Sabri, Memphis, TN (US); Steve W. Allison, Collierville, TN (US)

(72) Inventors: Firouzeh Sabri, Memphis, TN (US); Steve W. Allison, Collierville, TN (US)

( * ) Notice: Subject to any disclaimer, the term of this patent is extended or adjusted under 35 U.S.C. 154(b) by 321 days.

(21) Appl. No.: 15/937,457

(22) Filed: Mar. 27, 2018

(65) Prior Publication Data
US 2018/0274988 A1    Sep. 27, 2018

Related U.S. Application Data

(60) Provisional application No. 62/476,938, filed on Mar. 27, 2017.

(51) Int. Cl.
| | | |
|---|---|---|
| *G01J 5/00* | (2006.01) | |
| *G01K 11/00* | (2006.01) | |
| *G01K 1/00* | (2006.01) | |
| *G01K 11/20* | (2006.01) | |

(52) U.S. Cl.
CPC .................................. *G01K 11/20* (2013.01)

(58) Field of Classification Search
USPC ........................................ 374/161, 120, 130
See application file for complete search history.

(56) References Cited

U.S. PATENT DOCUMENTS

| | | | | |
|---|---|---|---|---|
| 4,075,493 A | * | 2/1978 | Wickersheim | G01J 5/08 356/44 |
| 4,448,547 A | | 5/1984 | Wickersheim | |
| 4,558,217 A | * | 12/1985 | Alves | G01K 15/00 250/227.23 |
| 4,560,286 A | | 12/1985 | Wickersheim | |
| 4,652,143 A | * | 3/1987 | Wickersheim | G01K 11/3213 250/458.1 |
| 5,730,528 A | * | 3/1998 | Allison | G01K 11/20 250/459.1 |
| 5,986,272 A | * | 11/1999 | Britton, Jr. | G01K 11/20 250/459.1 |
| 6,123,455 A | | 9/2000 | Beshears et al. | |

(Continued)

FOREIGN PATENT DOCUMENTS

| | | |
|---|---|---|
| CA | 1147111 | 5/1983 |
| CN | 1974709 | 6/2007 |

(Continued)

OTHER PUBLICATIONS

Katherine E. Mitchell et al., "Synthesis and characterization of flexible thermographic phosphor temperature sensors," Optical Materials (60): 50-56, 2016 (Amsterdam, Netherlands).

(Continued)

*Primary Examiner* — Mirellys Jagan

(57) ABSTRACT

A thin sensor film that is capable of indicating temperature and an associated sensor readout kit that illuminates the sensor film and detects the return fluorescence for analysis to determine temperature. The sensor film may be detached and reattached in order to be reused. The initial design achieves high sensitivity and accuracy in the range of interest to biologistics and can potentially address temperatures ranging from −200 to 300° C. A variation allows for the use of optical fibers for measurements of surfaces inside enclosures.

15 Claims, 7 Drawing Sheets

(56) References Cited

U.S. PATENT DOCUMENTS

| | | |
|---|---|---|
| 2003/0020088 A1 | 1/2003 | Seo |
| 2003/0030067 A1 | 2/2003 | Wei |
| 2004/0050476 A1 | 3/2004 | Hsu |
| 2005/0022697 A1 | 2/2005 | Benrashid |
| 2005/0064604 A1 | 3/2005 | Bohmann et al. |
| 2007/0092758 A1 | 4/2007 | Lee et al. |
| 2007/0096131 A1 | 5/2007 | Chandra |
| 2007/0114138 A1 | 5/2007 | Krasteva et al. |
| 2008/0012031 A1 | 1/2008 | Jang et al. |
| 2008/0029720 A1 | 2/2008 | Li |
| 2008/0103276 A1 | 5/2008 | Choi et al. |
| 2008/0157665 A1 | 7/2008 | Wu et al. |
| 2008/0173884 A1 | 7/2008 | Chitnis |
| 2008/0176066 A1 | 7/2008 | Chang et al. |
| 2008/0283864 A1 | 11/2008 | Letoquin et al. |
| 2008/0299398 A1 | 12/2008 | Hata et al. |
| 2009/0014736 A1 | 1/2009 | Ibbetson et al. |
| 2009/0039365 A1 | 2/2009 | Andrews et al. |
| 2009/0179207 A1 | 7/2009 | Chitnis et al. |
| 2010/0119839 A1 | 5/2010 | Chen |
| 2010/0289045 A1 | 11/2010 | Collins et al. |
| 2011/0215355 A1 | 9/2011 | Van De Ven |
| 2011/0215701 A1 | 9/2011 | Tong et al. |
| 2011/0229993 A1 | 9/2011 | Hsieh |
| 2011/0318226 A1 | 12/2011 | Ge et al. |
| 2012/0008647 A1 | 1/2012 | Matsuda |
| 2012/0025696 A1 | 2/2012 | Eden et al. |
| 2012/0087105 A1 | 4/2012 | Li et al. |
| 2014/0342480 A1 | 11/2014 | Matsunaga |
| 2015/0004726 A1 | 1/2015 | Konishi |

FOREIGN PATENT DOCUMENTS

| | | |
|---|---|---|
| CN | 104479437 | 4/2015 |
| CN | 105255479 | 1/2016 |
| JP | 2004250498 | 9/2004 |
| KR | 20060108843 | 10/2006 |
| WO | 94/11546 | 5/1994 |
| WO | 2015/193555 | 12/2015 |

OTHER PUBLICATIONS

Katherine Mitchell and F. Sabri, "Thermal, mechanical, and optical characterization of luminescence-doped PDMS thin film sensors,"Abstracts, 67th Southeast/71st Southwest Joint Regional Meeting of the American Chemical Society, Memphis, TN, United States, Nov. 4-7, 2015, SERMACS-SWRM-993 Publisher: American Chemical Society, Washington, D. C.

W. B. Hung and T. M. Chen, "Enhancing conversion efficiency of polycrystalline Si-based solar cells using down-shifting and anti-reflective Gd2O2S:Eu3+ phosphor," Kuangye (Taipei, Taiwan) (2015), 59(1), 81-90.

Wen-Bin Hung and Teng-Ming Chen, "Efficiency enhancement of silicon solar cells through a downshifting and antireflective oxysulfide phosphor layer," Solar Energy Materials Solar Cells (2015), 133, 39-47.

Cheng-Chang Chen et al., "Enabling lambertian-like warm white organic light-emitting diodes with a yellow phosphor embedded flexible film ," International Journal of Photoenergy (2014) 851371/1-851371/7.

Ea Cahya Septia Mahen et al., "Fabrication of BCNO-composite thin film phosphors and controlling its thickness," AIP Conference Proceedings (2013), 1554 (Padjadjaran International Physics Symposium, 2013), 135-138.

V. I. Verlan et al., "Optical absorption and photoluminescence of lumonophore nanocomposites," Physica Status Solidi C: Current Topics in Solid State Physics (2011), 8(9), 2837-2840.

Dehua Hu; Gang Cheng et al., "Peripheral cyanohexyl substituent in wide bandgap polymer: Increase the electron injection property for blue phosphorescence light emitting device," Macromolecular Rapid Communications (2011), 32(18), 1467-1471.

Arunandan Kumar et al., "Improved light extraction efficiency with angle independent electroluminescence spectrum in nano-phosphor coated white organic light emitting diodesm" Synthetic Metals (2011), 161(13-14), 1172-1176.

Yang-Yang Fan et al., "Modification and luminescence properties of transparent Lu2SiO5:Ce3+ thin-film phosphors," Guangpuxue Yu Guangpu Fenxi (2011), 31(2), 344-348.

Jin-Young Kim et al. "Electroluminescence enhancement of the phosphor dispersed in a polymer matrix using the tandem structure," Organic Electronics (2011), 12(3), 529-533.

Koji Aizawa and Yusuke Ohtani, "Ferroelectric and luminescent properties of electroluminescence devices using ferroelectric polymer-phosphor composite films," Key Engineering Materials (2009), 388(Electroceramics in Japan XI), 137-140.

J. C. Blakesley et al., "Organic semiconductor devices for X-ray imaging," Nuclear Instruments Methods in Physics Research, Section A: Accelerators, Spectrometers, Detectors, and Associated Equipment (2007), 580(1), 774-777.

Yutaka Ohmori et al. "Highly efficient organic light emitting devices with combination of fluorescent and phosphorescent materials for color tunable diode fabricated by all-wet process," Proceedings of SPIE—The International Society for Optical Engineering (2005), 5840(Pt. 1, Photonic Materials, Devices, and Applications),126-133.

S. W. Allison et al., "Exploration of Thin Polymer Films for Phosphor Thermometry," 62nd International Instrumentation Symposium Proceedings (2016) (Dayton, OH), available in Proceedings of the International Instrumentation Symposium (2016), 516, 30-39.

S.W. Allison et al., "In vivo X-Ray excited optical luminescence from phosphor-doped aerogel and Sylgard 184 composites," Radiation Physics and Chemistry (2017), 135, 88-93.

S. W. Allison and G.T. Gillies, "Remote thermometry with thermographic phosphors: Instrumentation and applications," Review of Scientific Instruments (1997), 68(7), 2615-2650.

F. Sabri, "Sensing with phosphor-doped PDMS," IET & ISA 60th International Instrumentation Symposium (2014) (London England), available in Proceedings of the International Instrumentation Symposium (2014) 630, 29-34.

M.B. Scudiere, D.L. Beshears, and S.W. Allison, "Fitting Offset Exponentials to Noisy Data" ISA 58th International Instrumentation Symposium (2012) (San Diego, CA), available in Proceedings of the International Instrumentation Symposium (2012) 491, 150-154.

S.W. Allison et al., "In Vivo X-Ray Imaging of Phosphor-Doped PDMS and Phosphor-Doped Aerogel Biomaterials," International Journal of Polymeric Materials and Polymeric Biomaterials (2015), 64(16), 823-830.

R.S. Fontenot et al., "Mechanical, spectral,and luminescence properties of ZnS:Mn doped PDMS," Journal of Luminescence (2016), 170, 194-199.

M.R. Cates et al., "Phosphor thermometry at cryogenic temperatures," Review of Scientific Instruments (1997), 68(6), 2412-2417.

F. Sabri et al., "Polymer-Encapsulated Phosphor Particles for In Vivo Phosphor Luminescence Applications," International Journal of Polymeric Materials and Polymeric Biomaterials (2015), 64, 690-694.

P. Parajuli et al., "Spincoat-fabricated multilayer PDMS-phosphor composites for thermometry," Measurement Science and Technology (2017), 28, 1-11.

D. Chen et al., "A Highly Sensitive Dual-Phase Nano-Glass-Ceramics Self-Calibrated Optical Thermometer," Analytical Chemistry (2016), 88 (7), 4099-4106, Web Publication Date: Mar. 3, 2016.

International Searching Authority, International Search Report and Written Opinion of the ISA for PCT/US2018/024587, dated Aug. 24, 2018.

\* cited by examiner

A.

Single Shot Acquisition with the overhead fluorescent lights on

B.

Single Shot Acquisition with the overhead fluorescent lights OFF

C.

128 average acquisition with lights on

D.

128 average acquisition with lights OFF

LIGHT WEIGHT FLEXIBLE TEMPERATURE SENSOR KIT

CROSS REFERENCE TO RELATED APPLICATIONS

This application claims the benefit of and priority to U.S. Provisional Application No. 62/476,938, entitled "Light Weight Flexible Temperature Sensor Kit" and filed on 27 Mar. 2017, the complete disclosure and contents of which are incorporated by specific reference in its entirety.

GOVERNMENT INTERESTS

Not Applicable.

FIELD OF THE INVENTION

The present invention relates generally to a temperature sensor kit that comprises a lightweight, flexible sensor and methods of employing the same.

BACKGROUND OF THE INVENTION

Many biomaterials and advanced pharmaceuticals (e.g. vaccines, tissue samples, blood, etc.) require shipment at a temperature within a specified region (commonly from about 2° to about 8° C.). Such high-value and temperature/time sensitive products are subject to increasingly stringent regulatory requirements for shipment control and monitoring, creating challenges not only for those needing to ship or receive the goods but also for supply chain and logistics providers. Therefore, there is a need for innovative solutions to scheduling and validation problems; adaptable, and customizable supply chain strategies and infrastructure for storage/distribution; and a highly specialized and compliant network to enable predictive insight, generate alternative procedures, ensure compliance with stronger regulations, and mitigate risk to maintain product integrity.

The current technology for this industry involves using heavy and expensive data loggers, thermocouples with connecting wires and leads, or temperature labels. All of these approaches have very limited performance capabilities and can be expensive or inaccurate. For example, the thin films and connecting wires utilized with resistive temperature detectors (RTD) are prone to damage and breaking, use expensive metals, and require connecting leads. Although less expensive than RTDs, infrared thermometry is suitable for only a limited number of surfaces and material types. Furthermore, temperature labels, another less expensive alternative, provide frequently inaccurate readings, have a significant delay time, require the user to physically read the label to assess the temperature, and may require multiple strips per package.

SUMMARY OF THE INVENTION

In various exemplary embodiments, the present invention comprises a flexible, lightweight sensor kit and associated methodology to determine the temperature of any material of interest. Embodiments comprise temperature sensitive, thin, and flexible film tags or sensor films that are easily attached/detached to/from the package of interest and can provide an instantaneous temperature reading, remotely. The subject invention is particularly useful for cold chain biologistics in the shipping and transportation industries but is applicable to other industries, including but not limited to aerospace, biomedical, and the petroleum industry. In various embodiments, the temperature sensor kit utilizes phosphor thermometry.

In several embodiments, the present invention comprises a thin film tape that is capable of indicating temperature and an associated sensor readout kit. In embodiments, the sensor readout kit detects the fluorescence emitted in response to illumination of the thin film tape. Embodiments also comprise a means for analyzing the emitted fluorescence to determine temperature. The sensor readout kit can further include a means for illuminating the sensor film. The sensor film can be detached and reattached in order to be reused. The design achieves high sensitivity and accuracy in the range of interest to biologistics and can potentially address temperatures ranging from −200 to 300° C. A variation allows for the use of optical fibers for measurements of surfaces inside enclosures.

Embodiments of the present invention utilize the temperature-dependent luminescence of phosphor-containg substances to determine the temperature of the surface to which the phosphors are attached. Embodiments of the present sensor kit can be easily operated and carried by a user, having utility for portable applications. Therefore, the invention has extensive applicability and can use a single unit type to service wide variety of industries and purposes.

In certain embodiments, the present invention provides a method for determining the temperature of a packaged material comprising subjecting a phosphor-doped sensor film to an excitation source; causing luminescence of the phosphor-doped sensor film; capturing the resultant phosphor luminescence via a suitable detector; converting the luminescence to an electrical analog; digitizing the analog signal to create a digital signal; analyzing the digital signal to determine the temperature of the phosphor-doped sensor film; and displaying the assessed temperature to a user.

Also disclosed is a method of creating a multi-layer phosphor-doped sensor film, the method includes a first layering step and a second layering step. The first layering step comprises dispensing a first mixture onto a sacrificial layer; spinning the first mixture and sacrificial layer; and curing the first mixture to form a first layer. The second layering step comprises dispensing a second mixture onto the first layer; spinning the second mixture and first layer; and curing the second mixture to form a second layer. The method further includes removing the first and second layers from the sacrificial layer. In the method, the first and second mixtures comprise an elastomeric compound, and at least one mixture comprises a first concentration of a phosphor-containing substance.

Another aspect includes a kit for determining a temperature of packaged material. The kit comprising a phosphor-doped sensor film disposed upon a package; an excitation source configured to cause luminescence of the phosphor-doped sensor film; a detector configured to capture the luminescence; a computing device configured to determine temperature based on the captured luminescence; and a display configured to present the temperature to a user.

Other objects and advantages of this invention will become readily apparent from the ensuing description.

DETAILED DESCRIPTION OF THE INVENTION

Figure 1:
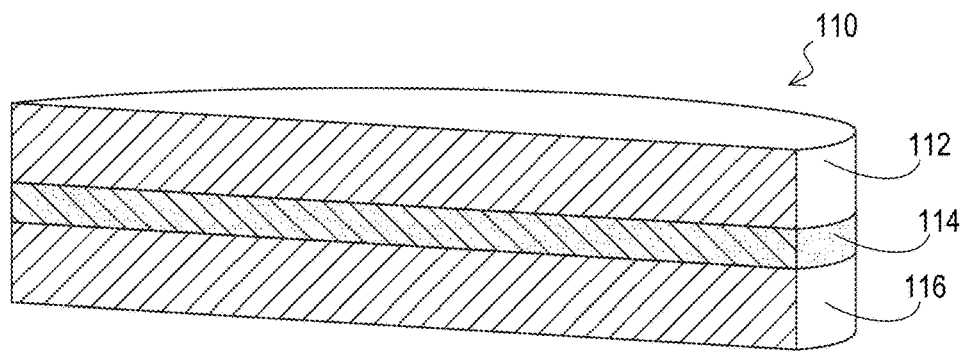
FIG. 1 is a schematic of an embodiment showing a layered structure of an enlarged sensor film.

All patents, patent applications, and publications cited herein are hereby incorporated by reference in their entirety in order to more fully describe the state of the art as known to those skilled therein as of the date of the invention described and claimed herein.

Detailed descriptions of one or more preferred embodiments are provided herein. It is to be understood, however, that the present invention can be embodied in various forms. Therefore, specific details disclosed herein are not to be interpreted as limiting, but rather as a basis for the claims and as a representative basis for teaching one skilled in the art to employ the present invention in any appropriate manner.

The singular forms "a," "an," and "the" include plural reference unless the context clearly dictates otherwise. The use of the word "a" or "an" when used in conjunction with the term "comprising" in the claims and/or the specification can mean "one," but it is also consistent with the meaning of "one or more," "at least one," and "one or more than one."

Wherever any of the phrases "for example," "such as," "including" and the like are used herein, the phrase "and without limitation" is understood to follow unless explicitly stated otherwise. Similarly "an example," "exemplary," and the like are understood to be nonlimiting.

The term "substantially" allows for deviations from the descriptor that do not negatively impact the intended purpose. Descriptive terms are understood to be modified by the term "substantially" even if the word "substantially" is not explicitly recited. Therefore, for example, the phrase "wherein the lever extends vertically" means "wherein the lever extends substantially vertically" so long as a precise vertical arrangement is not necessary for the lever to perform its function The terms "comprising" and "including" and "having" and "involving" (and similarly "comprises," "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a process involving steps a, b, and c" means that the process includes at least steps a, b and c. Wherever the terms "a" or "an" are used, "one or more" is understood, unless such interpretation is nonsensical in context.

As used herein the term "about" is used herein to mean approximately, roughly, around, or "in the region of." When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

The present approach for temperature determination falls under the category of phosphor thermometry. Briefly, phosphors are powders that luminescence upon excitation by an external light source. The emission properties of some of such phosphors depend on temperature. Hence measuring these properties can indicate the temperature of the surface to which or with which said phosphors are attached or are in contact. Under the present approach, a phosphor target can be illuminated with a light source in order to stimulate phosphor luminescence. An optical arrangement can direct this illumination to the phosphor target and also captures the ensuing luminescence, directing it to a suitable detector. The detector converts the optical signal to its electrical analog. The analog signal is digitized and then analyzed to determine and then display the temperature. This general approach can be utilized for situations that range in temperature from the cryogenic to well above 1000° C.

Phosphor-doped polymer films represent a promising avenue for thermometry applications. Phosphor-doped thick polymer films prepared by drop-casting method luminesce with high brightness and preserve the same temperature-dependence of the emission as the phosphor powder. However, in many cases a thick film will not be suitable. For instance, thermal equilibration with the substrate to which it adheres could be a problem in high heat flux situations, such as when there is a large temperature difference with the surrounding environment. In such instances, heat transfer and conduction issues are of greater importance. This is one impetus for exploring thinner films as thermographic sensors. The embodiments described herein extend the exploration of $La_2O_2S:Eu$ phosphor-doped polymer materials to much thinner films, for example, between 0.1 and 0.4 mm (or wider range), created by means of spin-coating technology. The exemplary embodiments described herein cover dopant concentration levels ranging from 5 to 50 wt %. In several exemplary embodiments, either an LED or a laser diode provides excitation, and the $^5D_2$ state nis monitored. Data from these exemplary embodiments comprise the excitation/emission behavior from −20 to 75° C. The measured signal intensity for different temperatures is sufficient for a number of applications, from aerospace to biomedical research.

All methodology listed within this application relates only to the exemplary embodiments disclosed herein. It is to be understood, however, that the present invention can be embodied in various forms. Therefore, specific methodology or embodiments disclosed herein is not to be interpreted as limiting, but rather as a basis for the claims and as a representative basis for teaching one skilled in the art to prepare the present invention in any appropriate manner.

In several disclosed exemplary embodiments, composite polymer samples containing different concentrations of phosphors are prepared by combining a polymer with a phosphor-containing substance. Appropriate amounts of the phosphor-containing substance are added to the polymer gradually to create a mixture for sensor films with varying concentrations of phosphors. The mixture is stirred and can then be out-gassed. The mixture is then dispensed onto a sacrificial layer (such as a rimless aluminum pan) and then spun under experimentally optimized parameters. The mixture is then cured to create a layer of the sensory film. Multi-layered structures can be prepared by spincoating and curing each layer individually and then preparing the next layer after complete curing of the previous layer. The cured layers are then carefully peeled away from the sacrificial support layer to create a sensor film.

FIG. 1 shows an enlarged schematic view of a layered sensor film 110 under one exemplary embodiment. In FIG. 1, the sensor film 110 is enlarged to show three distinct layers, two outer layers 112, 116 and an inner layer 114. At least one of the three layers 112, 114, 116 can be doped with a phosphor-containing compound. At least two of the layers can be doped with a phosphor-containing compound. In embodiments, at least one of the does not comprise a phosphor-containing compound.

Figure 2:
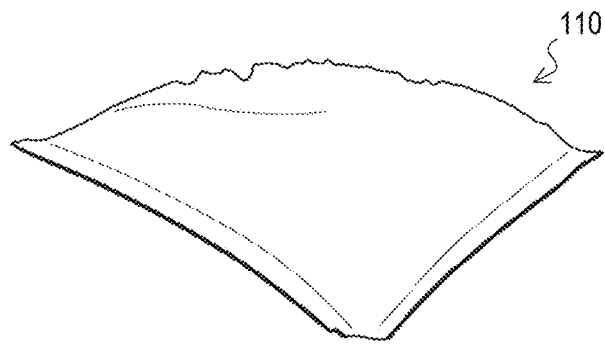
FIG. 2 is a schematic view of a thin sensor film in accordance with one embodiment.

FIG. 2 is a top perspective view of a sensor film 110. In this view, it can be seen that the sensor film is very thin. In embodiments, the sensor film is about as thin as a piece of transparent, household tape.

In several embodiments, the thin film tape or sensor film 110 indicates temperature when properly illuminated and read by a sensor kit (see FIGS. 3, 8, 9, 10, 13, and 14). In certain non-limiting embodiments, the sensor tag or sensor film 110 can be applied to a package of interest. The film 110 can be attached and reattached for use on multiple occasions and with multiple packages. Embodiments also allow the sensor film 110 to be fully sterilized between uses if necessary. The film 110 can be composed of recyclable material. The sensor film 110 can be made into any geometry, shape, and size, and the sensing area is also customizable.

In several embodiments, the sensor film comprises lanthanum oxysulfide ($La_2O_2S$) phosphor-doped polymer materials. The phosphor-doped sensor film can comprises europium doped $La_2O_2S$ ($La_2O_2S:Eu$). The semspr film can comprise La2O2S:Eu, 0.1 mol % powder. The polymer utilized in the sensor film can comprise any optically transparent elastomer. In embodiments, the polymer utilized in the sensor film can be tailored to suit the intended application. The polymer can comprise polydimethylsiloxane (PDMS). In exemplary embodiments, the polymer utilized in the sensor film comprises commercially available Sylgard 184 (available from Dow Corning, Midland, Mich., USA). In non-limiting embodiments, the sensor film is less than about 1 mm in thickness. In certain embodiments, the film can be between about 0.1 mm and about 0.4 mm thick, inclusive. Films less than 0.1 mm thick are conceivable.

In certain non-limiting embodiments, the sensor film 110 comprises gradient dopant concentrations of phosphor. In layered embodiments such as FIG. 1, the concentration of phosphor dopant in each layer can vary. Each layer can comprise 0% to 99% dopant. In the FIG. 1 embodiment, the sensor film 110 comprises two outer layers (a top layer 112 and a bottom layer 116) and a middle layer 114. The outer layers 112, 114 can comprise different concentrations of dopant, while the middle layer can comprise pure polymer. The outer layers can comprise between about 1% to about 50% doped polymer. More specifically, one outer layer can comprise as low as 5% doped polymer while the other outer layer comprises as high as 20% doped polymer. The sensor film can be doped with phosphor at concentration levels ranging from about 1 to about 80 wt %. In other embodiments, the phosphor concentration of the sensor film is between about 5 and about 50 wt %, inclusive. Several embodiments of the sensor film can also contain means for allowing for modification of thermal conductivity of the film while preserving thermographic properties. A nonlimiting example of such means for modification of thermal conductivity includes carbon powder.

When functioning in the range of interest to biologics (typically from about 2° to about 8° C.), nonlimiting embodiments of the sensor film can achieve high sensitivity and accuracy. In one particular embodiment, accuracy of about +/−0.2° C. is achieved when analyzing temperature within the preferred range. In some embodiments a sensitivity of up to 0.05° C. is achievable. Without wishing to be bound by theory, sensor films can address temperatures ranging from −200 to 300° C.

Figure 3:
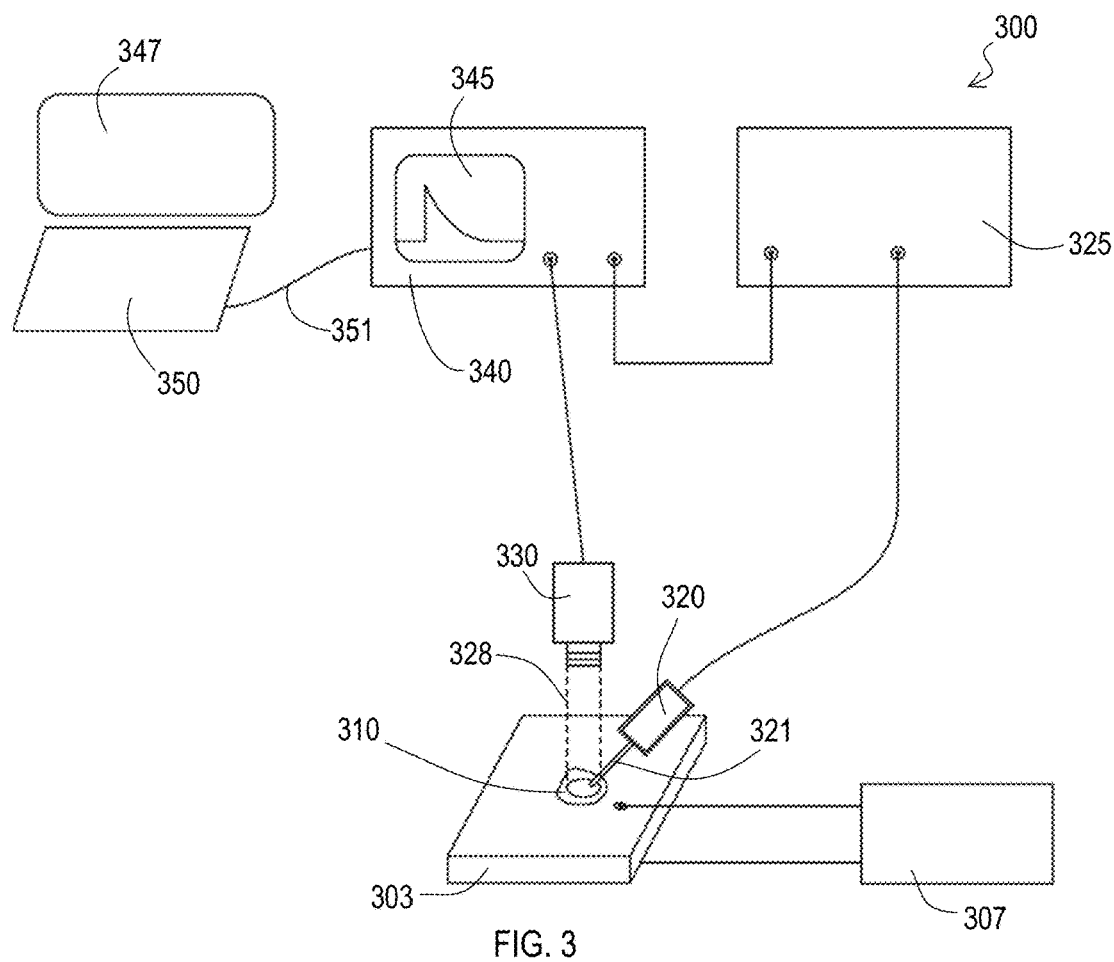
FIG. 3 shows an embodiment of the apparatus arranged for experimental use.

FIG. 3 shows a diagrammatic embodiment of the sensor kit 330 arranged for experimental use. The sample 310 can be seen attached to a temperature controlled plate 303. The temperature controlled plate 303 is kept at a given temperature via a temperature controller 307. An LED 320 is shown connected to a pulse generator 325. The LED emits a light 321 to illuminate the sample 310. In response to illumination, the sample 310 fluoresces. The emitted fluorescence 328 is directed to a detector 330 that converts the detected fluorescence to an analog signal. An oscilloscope 345 can be seen, which converts the analog signal into a digital signal. In the FIG. 3 embodiment, the oscilloscope is equipped with a display 345. The digital signal is then transmitted via a wired connection 351 or wirelessly to a computing device 350 with a display screen 347. In embodiments, the computing device can be a computer, a hand-held device, a cellular telephone, or similar electronic device.

The pulse generator 325 in FIG. 3 can provide a pulse to trigger the oscilloscope to capture a luminescence signal at the proper time (e.g. coincides with the LED pulse). In embodiments, the pulse generator allows the oscilloscope to capture a signal simultaneously with the activation of the sensor stimulation source.

The data from disclosed in FIGS. 4-7 are derived from the experimental embodiment as shown in FIG. 3 (discussed in Example 1 below).

Figure 8:
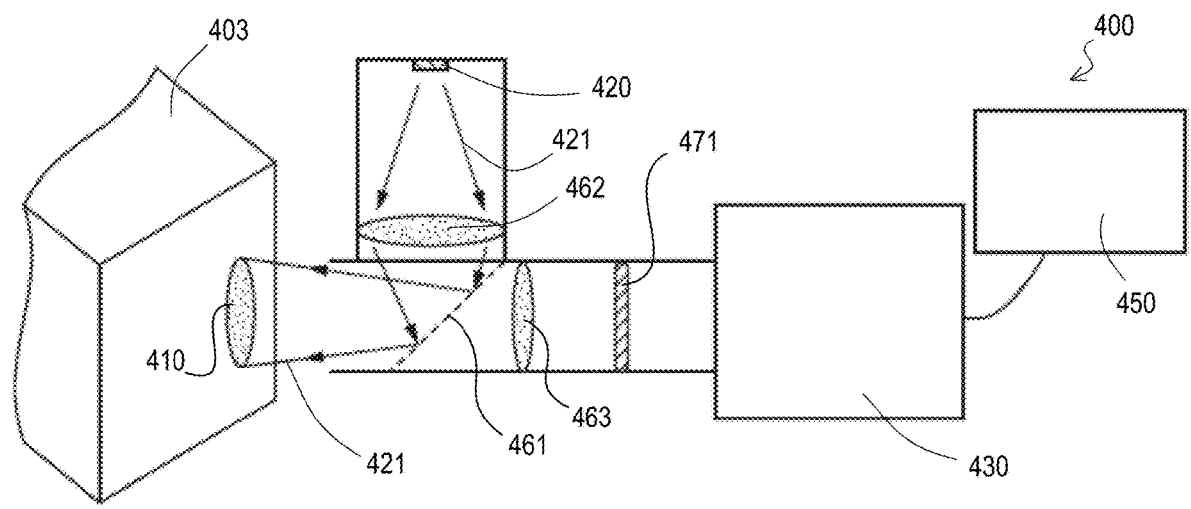
FIG. 8 provides a schematic top view of one embodiment.

FIG. 8 shows a schematic of an embodiment with a sensor kit 400. In this embodiment, the light source for exciting the luminescence is a light emitting diode (LED) 420. The LED emits a light 421 that passes through a first lens 462. In this embodiment, the first lens 462 collimates or focuses the diverging light from the LED 420. After passing through the lens 462 the light 421 is reflected from a dichroic mirror 461 to exit the probe and strike the sensor film 410 attached to a package 403. Upon excitation of the sensor film 410, the film fluoresces and the emitted fluorescence passes through the dichroic mirror 461 and is then focused by a second lens 463 to pass through a bandpass filter 471 and to the detector 430. The bandpass filter 471 discriminates the emitted fluorescence from room light and luminescence wavelengths that are not temperature dependent. In embodiments, the detector 430 is a photomultiplier tube that converts the emitted light signal to its electrical analog.

The LED is pulsed for a chosen duration. The duration can range from a few nanoseconds to milliseconds as determined by the user. The repetition rate can also be chosen as desired. In this embodiment, the repetition rate is 20 pulses per second. A suitable pulse generator (discussed below) can power the LED. The LED can be packaged inside a tubular structure as indicated by FIGS. 9-10.

Figure 9:
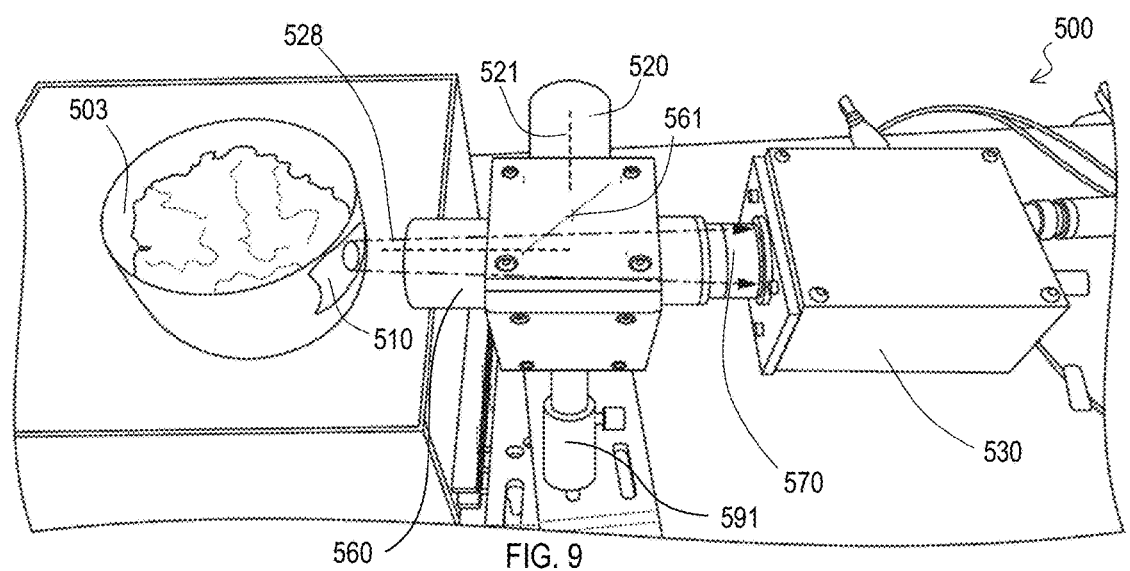
FIG. 9 shows a top perspective view of the sensor kit under one embodiment. The sensor film is shown attached to the outside of an ice-filled container.
Figure 10:
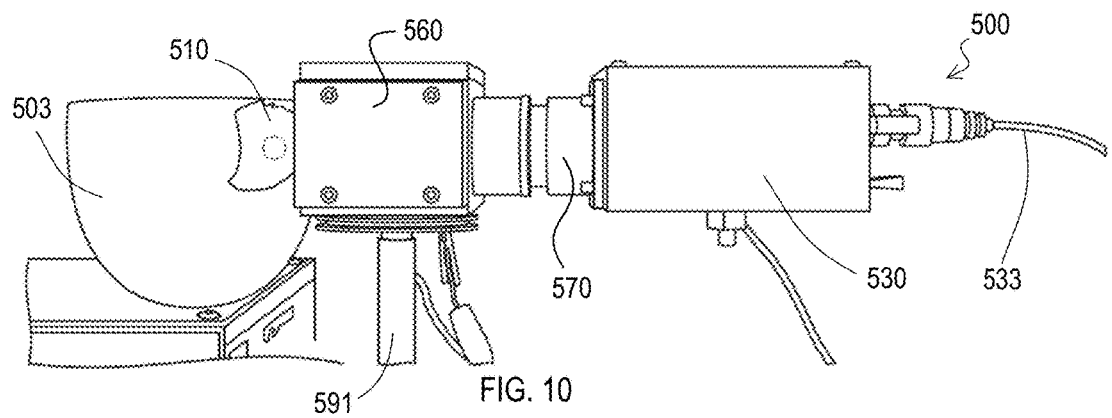
FIG. 10 provides a side view of the FIG. 9 embodiment showing luminescence of the sensor film.

Another exemplary embodiment of the invention is shown in FIGS. 9 and 10, wherein a phosphor-doped film adheres to a metal cup filled with ice. In the FIG. 9 embodiment, a portion of the sensor kit 500 is shown as a single unit or a continuous and enclosed apparatus. The sensor kit includes a stimulation source 520, a detector 530, and optical elements 560, 570. The dotted lines 521 represent the path of light from the excitation source 520. In this embodiment, the light 521 is reflected via a dichroic mirror toward the sensor film 510. The solid arrows 528 represent the path of fluoresce emitted from the sensor film upon excitation by the incoming light 521. As shown the emitted florescence passes into the front portion 560 of a housing for optical elements and travels through the back portion 570 of the optical element housing to enter the detector 530. In embodiments, the optical elements housing is comprised of anodized aluminum. In the FIG. 9 embodiment, the detector is a photomultiplier that converts the emitted fluorescence to an analog signal. A wired connection (533 of FIG. 10) is utilized to transmit the analog signal to a means for digitizing the signal. In alternative embodiments, the means for digitizing the analog signal is also included in the unit of the sensor kit 500. Embodiments with a means for digitizing the analog signal within the unit can be equipped with a means for wirelessly transmitting the digital signal to a computing device. In embodiments, the wireless signal is configured to travel to a remote location. The optical elements housing can house one or more lenses, bandpass filters, mirrors, or any other optical element suitable for directing or filtering light.

FIG. 10 is a side view of this exemplary embodiment. In certain embodiments, the fluorescence can be comprised of a number of different wavelengths from the blue to the near infrared.

In the embodiment of FIGS. 9 & 10, the sensor kit is supported by a stand 591 such as commercially available optical mounting hardware. In alternative embodiments, a handle is placed on the unit 500 to allow a user to easily move the sensor kit and rapidly obtain readings from various sensor films or from various packages.

In embodiments of the invention, the sensor kit is lightweight and readily portable. The scale and weight of the components can be small enough for portable applications. The system can be packaged in an ergonomic manner for easy deployment by a user. The system can comprise a hand-held unit that includes optical elements, an excitation source, and a detector. The sensor kit can include a means for detecting the emitted light following illumination of the sensor film and a means to illuminate or otherwise stimulate the sensor film. In alternative embodiments, the kit does not include the means for illuminating the sensor film. In embodiments, the kit analyzes the return light to determine the temperature of the sensor film. Certain embodiments comprise onboard intelligence that stores relevant measurement information and communicates data wirelessly.

The LED can emit light at any wavelength within the visible or non-visible spectrum. In certain embodiments, the LED emits at about 365 nm, the near ultraviolet range. In other embodiments, the source for inducing sensor tag or sensor film luminescence is a laser diode. In some embodiments, the laser diode emits about a 405 nm laser to stimulate luminescence of the sensor film. In embodiments, a suitable pulse generator (see 325 at FIG. 3) is utilized to power the stimulation source. Using the pulse generator, the stimulation source can be pulsed at a frequency selected by the end user. In certain embodiments, the duration of the pulse can be chosen by the user and can range from a few nanoseconds to milliseconds. Furthermore, in several embodiments, the repetition rate of the pulse can be chosen as desired by the user.

The bandpass filter can selectively allow wavelengths from about 350 nm to about 750 nm to pass therethrough. The bandpass filter of embodiments can allow wavelengths of about 510 nm to pass through to the detector.

In additional embodiments, the detector can be a photomultiplier tube (PMT) that converts the emitted light signal to an electrical analog.

In several embodiments, the kit additionally comprises an onboard sensor that detects background light and advises the user to adjust the position of the detector or kit to reduce the background light to a suitable level.

In embodiments, the electrical signal must be digitized and analyzed to determine, display, and archive the results. As discussed herein, a laboratory oscilloscope can digitize the signal, display the signal for inspection, and communicate the signal to a suitable computing device. In certain embodiments, a laboratory pulse generator provides the electrical drive pulse to the LED and a pulse synchronous with it for triggering the oscilloscope at the proper time to capture the luminescence signal.

Figure 11:
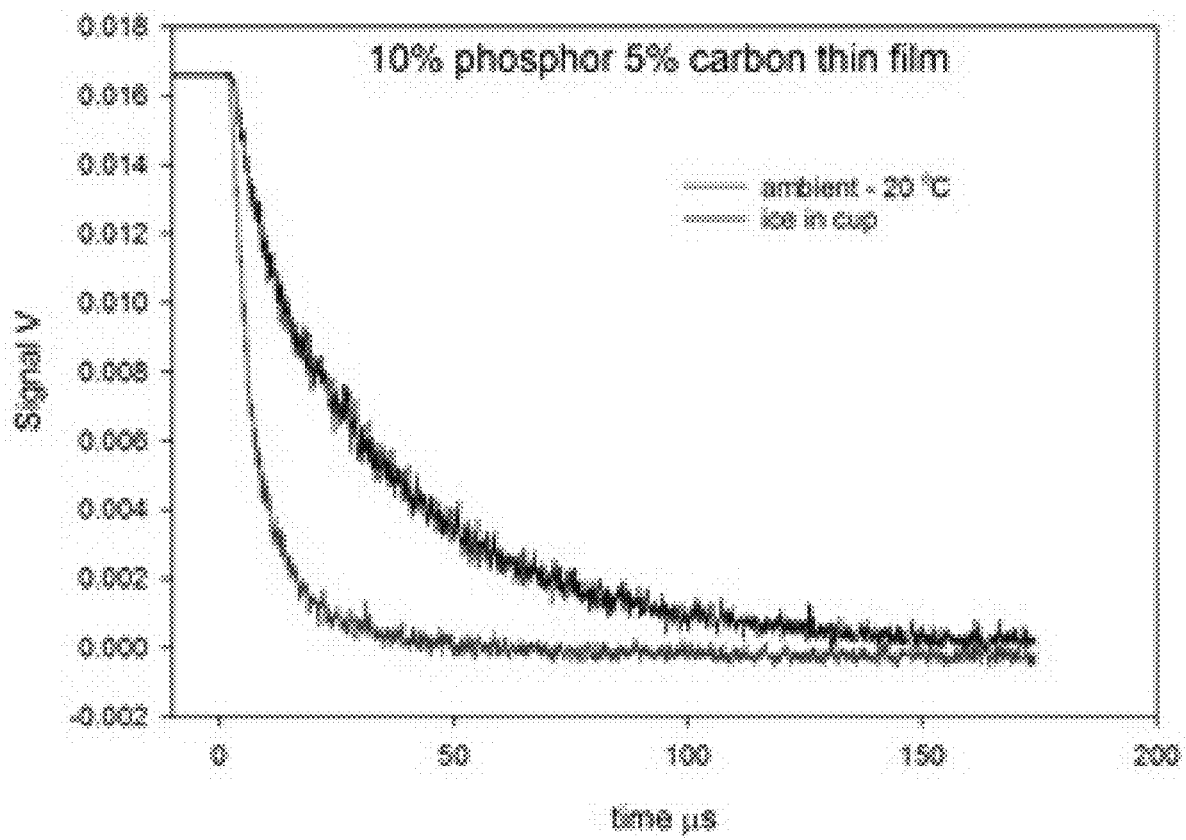
FIG. 11 shows an example signal from the experimental embodiments depicted in FIGS. 9 and 10, wherein the sensor film comprises 10% phosphor and 5% carbon at ambient and near freezing temperatures.

As seen in FIG. 11, when the LED turns on in this exemplary embodiment, the fluorescence signal level immediately rises. Upon termination of the LED, the fluorescence decreases exponentially. The time dependence of the decay can be generally represented by the following equation:

$$I_0 = I_0 e^{-1/\tau}$$

In the equation, I is the instantaneous intensity, usually measured in volts, $I_0$ is intensity at the moment of LED cutoff, and $\tau$ is the characteristic decay time. The decay time, $\tau$, is the time required for the signal to fall by 1/e of its value. This is the fluorescence characteristic that is very temperature dependent and exploited in the disclosed embodiments to determine temperature.

Figure 12:
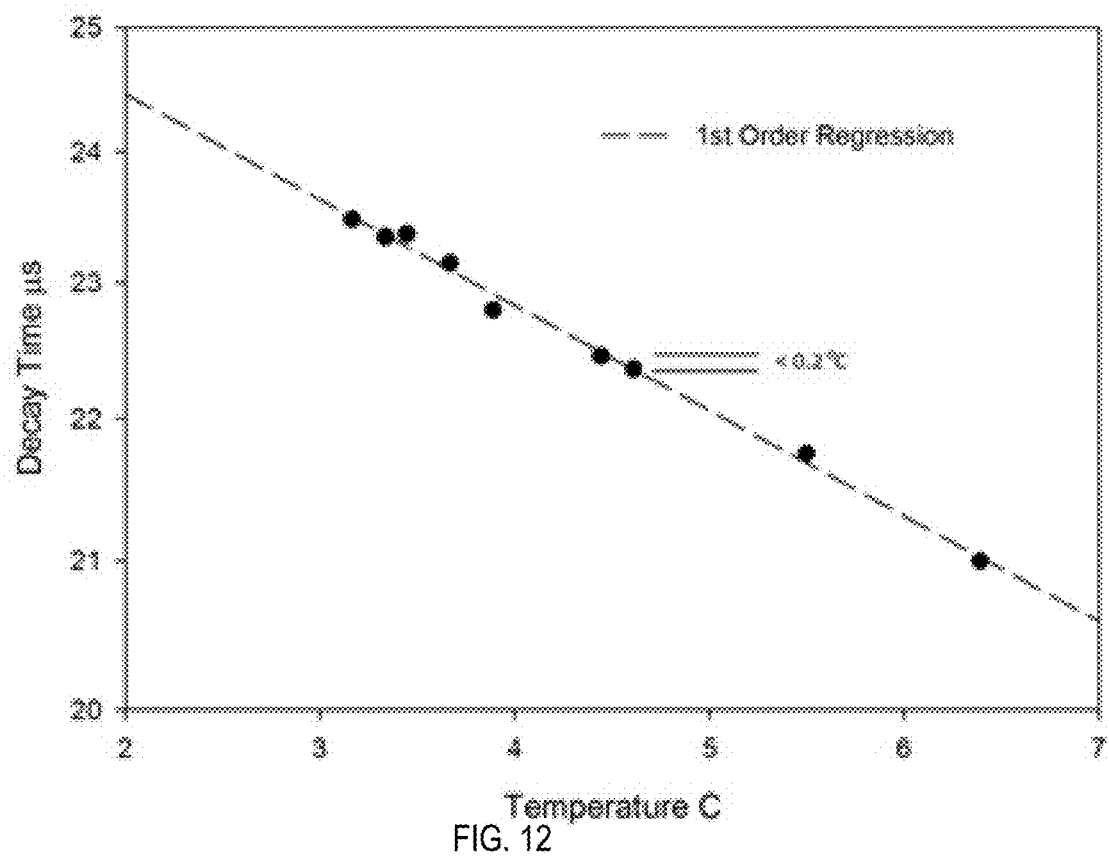
FIG. 12 shows that signal decay time in one embodiment is inversely proportional to temperature ranging from 2° C. to 7° C. with very little variance.

The data disclosed in FIGS. 11-12 were generated from the embodiment shown in FIGS. 9-10. FIG. 11 shows an exponential decay after stimulation of the phosphor film time is maintained at varying temperatures, even when carbon is present within the sensor film. Referring now to FIG. 12, the embodiments of the sensor film are highly sensitive and accurate, achieving precision of +/−0.2° C. when analyzing temperature within the range of 2° C. to 7° C., which is the target temperature range utilized in biologistics.

Figure 13:
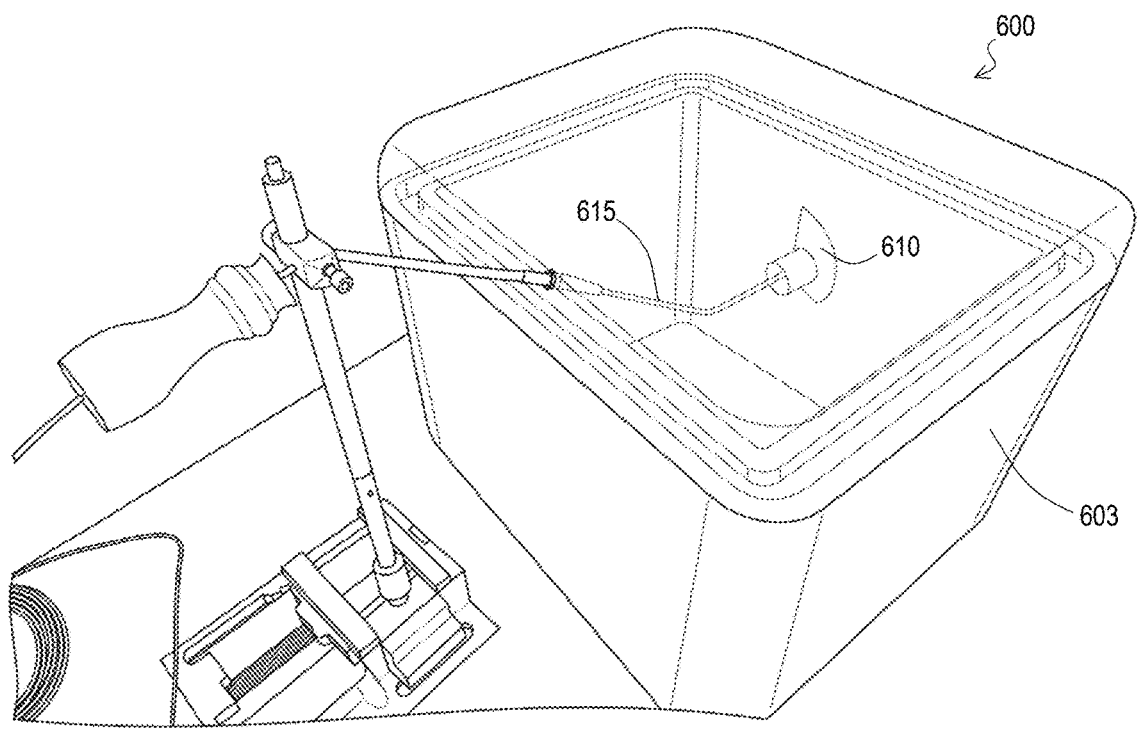
FIG. 13 shows an embodiment that employs a fiber optic wand for close temperature proximity measurement.

In certain embodiments, the sensor kit comprises an attachment to incorporate an optical fiber or bundles of optical fibers for temperature measurements of surfaces inside enclosures. FIG. 13 shows one embodiment 600 configured to provide temperature measurements from inside of a package 603. As shown in the figure, a sensor film 610 is attached to the interior wall of a package 603. A fiber optic cable 615 extends into the package 603 and terminates adjacent to the sensor patch 610. In the FIG. 13 embodiment, the optical fiber 615 transmits the illumination to the sensor film 610, captures the emitted luminescence, and conveys the emitted luminescence back to the sensor kit to which the fiber 615 is attached.

Figure 14:
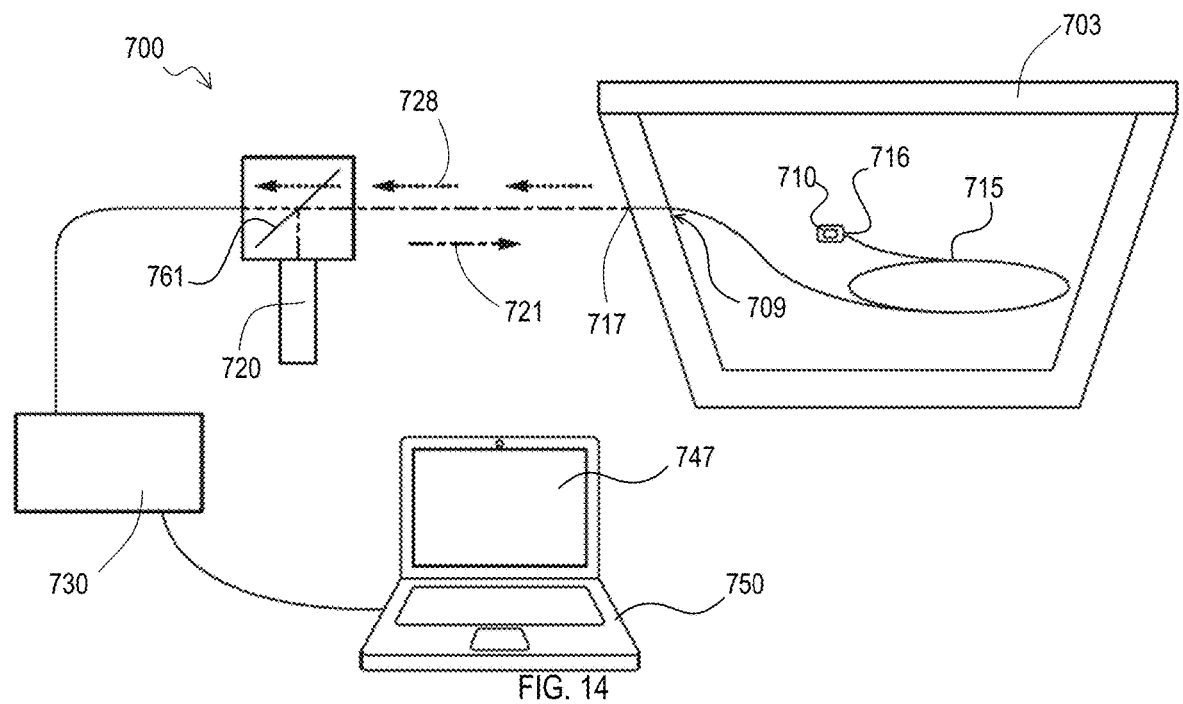
FIG. 14 shows an embodiment that employs a fiber optic cable for non-contact assessment of temperature inside of a package.

FIG. 14 provides an alternative embodiment 700 configured to assess and record temperature from within an enclosure. A fiber optic cable 715 can be seen inside of a package 703. One end 716 of the fiber optic cable 715 is encased within a phosphor containing film 710. The opposite end 717 of the fiber optic cable 715 is disposed within a hole or channel 709 that extends through a wall of the package 703. In the FIG. 14 embodiment, the opposite end 717 of the fiber optic cable 715 terminates at an outer wall of the package 703. In embodiments, the tip 717 of the fiber optic cable 715 is flush with the outer wall of the package 703. An excitation source 720 is shown emitting a laser that reflects off of a dichroic mirror 761 and travels in the direction of arrow 721. The laser reaches the terminal end of the fiber optic cable 715, and the light travels along the length of the cable to excite the phosphor-containing film 710. The resultant luminescence emitted from the sensor film 710 travels back through the optic fiber and exits the package in the direction of arrow 728. The emitted fluorescence travels through the dichroic mirror 761, and the signal is transferred to a detector 730. After being converted to an analog signal, the signal is digitized and transmitted 751 to a computing device 747 for analysis or storage. In embodiments, the transmission 751 to the computing device 747 can be a wired or a wireless connection. The computing device 747 can be configured to digitize the analog signal.

Under certain embodiments, the sensing film is located inside the enclosure and on the relevant surface whose temperature is required.

The present invention possesses several advantages. Many phosphor coatings exhibit a luminescence useful for thermometry for various situations. However, traditional phosphor-based thermometry achieved through direct deposit or gluing phosphor compounds to the surface of interest is destructive, invasive, and limited only to surfaces where an adhesive can be attached. The present invention allows the highly sensitive and accurate temperature measurement technique to be used in a wide variety of industries since the temperature sensitive portion is enclosed and encapsulated inside an inert, transparent, and biocompatible polymer. In certain embodiments, the phosphor material is incorporated into thin films of silicone that are fabricated by the spin coat method.

Embodiments can also be customizable or otherwise adjusted to suit a particular application. As shown in the embodiment used to collect data for FIG. 11, carbon powder can be added to the phosphor-silicone mixture to modify thermal conductivity while preserving thermographic properties. The film thus constituted can also be termed as a sensor tag. Embodiments of the sensor film are easily attached to most any material surface and also easily removed for reuse. The material expense is a fraction of a cent. Also, the type of silicone encapsulating the temperature-sensitive components can be tailored to suit the application for which it is intended. It also is possible to reclaim and recycle the phosphor material.

Figure 15:
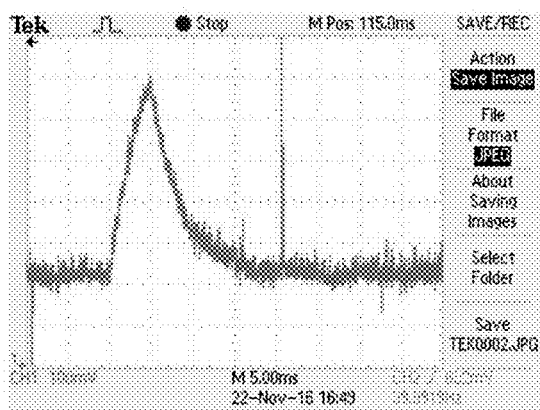
FIG. 15 depicts scope traces obtained from the FIG. 14 embodiment under varying fluorescence acquisition parameters.
Figure 15:
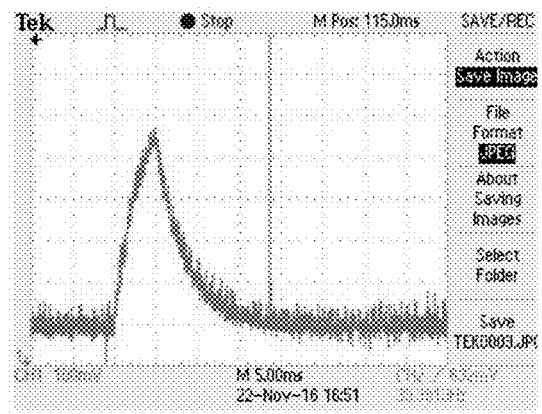
Figure 15:
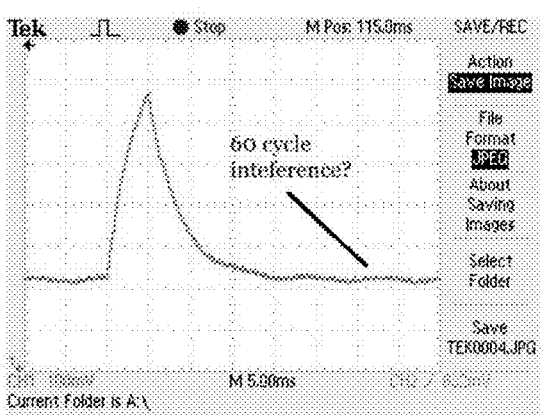
Figure 15:
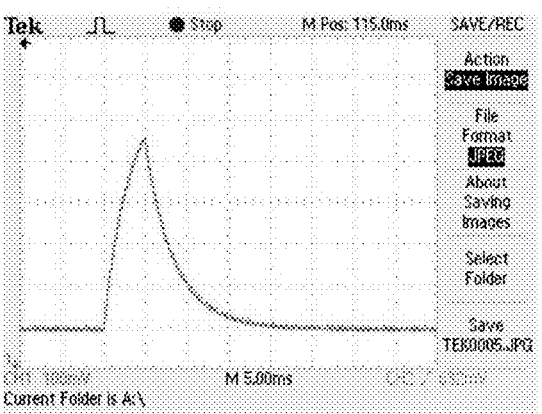

In several embodiments, the phosphor tag or sensor film temperature reader is portable. Embodiments can comprise one or more of the following features:

a) A low power LED or laser diode illuminates the film. Because background light can sometimes affect the measured signal, an onboard sensor can be installed to detect background light and, if above a certain level, can advise the user to adjust the position of the reader to bring to a suitable lower level.

b) An attachment allows the reader to connect to an optical fiber or bundle of fibers. The sensor-ends of the fibers are located inside of the package under test. This permits internal temperature measurement, as seen in FIGS. 13-15.

c) Wireless communication (such as, but not limited to, Bluetooth) between the reader and remote data acquisition system, which also can comprise a smartphone or other mobile device.

Various embodiments comprise a computing device (see FIGS. 3 and 14) to receive and store digitized luminescence data from the sensor film for analysis. In some embodiments, luminescence data from the sensor film is communicated to a computing device wirelessly. The computing device can comprise a portable digital assistant, a tablet, a smartphone (such as iOS™ and Android™ based devices), laptops, etc. In still other embodiments, a computer and a mobile device can be used in combination for analysis, storage, or display of data, or any combination thereof. In embodiments, the computing device comprises a single-board computer.

Certain embodiments comprise at least one mobile device application running on a processor of a mobile computing device. The mobile computing device may include a smartphone but embodiments are not so limited. The sensor kit can be communicatively coupled with a mobile device application through one or more wireless communications protocols. The mobile device application may present data directly to a user through a smartphone application display. The mobile device may be communicatively coupled to one or more applications running on at least one processor of a remote server. The mobile device application may transmit data or results of data analysis to the remote server.

In some embodiments, the digitized temperature information is stored on a computing device for later review or analysis. In some embodiments data from the sensory film is communicated to an end user at a remote location.

The computing device can be communicatively coupled to the sensor kit via a wireless local area network (WLAN). A WLAN connection may implement WiFi™ communications protocols. Alternatively, the communicative coupling can comprise a wireless personal area network (WPAN). A WPAN connection may implement Bluetooth™ communications protocols. Under an embodiment, the sensor kit may additionally comprise a data port for relaying temperature data from the sensor kit to the mobile device application or other computing device. The data port may be a USB connection or any other type of data port. The data port allows for a wired communication between the senensor kit and separate computing devices. The data port may be used alone or in combination with the wireless transceiver of the sensing device described above.

Computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The systems and methods for tracking and reporting temperature data can be a component of a single system, multiple systems, and/or geographically separate systems. The embodiments presented herein can also be a subcomponent or subsystem of a single system, multiple systems, and/or geographically separate systems. The components of embodiments can be coupled to one or more other components (not shown) of a host system or a system coupled to the host system.

One or more components of the sensor kit or a corresponding interface, system, or application to which the sensor kit is coupled or connected includes or runs under or in association with a processing system. The processing system includes any collection of processor-based devices or computing devices operating together, or components of processing systems or devices, as is known in the art. For example, the processing system can include one or more of a portable computer, a portable communication device operating in a communication network, or a network server. The portable computer can be any of a number or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, or provided by some combination of algorithms. The systems and methods described herein can be implemented in one or more of software algorithm(s), programs, firmware, hardware, components, circuitry, in any combination.

The components of any system that include the embodiments described herein can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), cellular networks, proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the sensor kit and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the presently disclosed embodiments include: microcontrollers with memory (such as electronically erasable programmable read only memory (EEPROM)), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data or instructions embodied in various computer-readable media, in terms of their behavioral, register transfer, logic component, transistor, layout geometries, or other characteristics. Computer-readable media in which such formatted data or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data or instructions by carrier waves include, but are not limited to, transfers (uploads, downloads, e-mail, etc.) over the Internet or other computer networks via one or more data transfer protocols (e.g., HTTP, FTP, SMTP, etc.). When received within a computer system via one or more computer-readable media, such data, or instruction-based expressions of the above described components may be processed by a processing entity (e.g., one or more processors) within the computer system in conjunction with execution of one or more other computer programs.

The present system will, upon press of a button or other activation trigger, acquire the data for the sufficient time to attain a valid temperature reading. The system is flexible and modular, which permits applications for a wide range of temperatures. The embodiments described herein include applications for low temperatures of particular importance to the cold chain and biologistics. However, by incorporating different phosphors into the sensor tags or sensor films, other temperature ranges can be assessed. A large database of thermographic phosphors is known in the art and from this selection can be made for the temperature range of interest, including any commercially useful temperature range.

In addition, embodiments can also comprise phosphor-doped aerogel materials. These materials, while not as flexible, have advantages with regard to the properties of density and thermal conductivity that could be beneficial in certain applications. The surface of the flexible sensor films can be treated so as to prevent or discourage accumulation of moisture and frost by application with antifreeze or engineering the surface to be hydrophobic.

A summary listing of some advantages of the present invention is as follows: portable-compact; high temperature sensitivity (less than 1° C. sensitivity); wireless communication with smart phone; may be modified to detect other parameters of interest such as moisture, oxygen pressure, strain, vibration etc.; same sensor can be used to go from cryogenic temperatures to several hundred degrees; sterilizable; reusable; lack of leads, cables, wires, etc; cost-effective (does not use precious metals such as platinum); lightweight sensor film (like a band aid); sensor film can be made into any geometry, shape, size; and the sensing area can be custom designed.

Embodiments of the present invention are configured to accurately assess a wide range of temperatures. Certain embodiments obtain temperature readings between 100° C. and −100° C. Embodiments can assess temperatures between 50° C. and −50° C. In certain embodiments accurate temperature readings are obtained between approximately −25° C. to approximately 25° C. In several embodiments, the present invention applies to a temperature range of 2 to 8° C., a temperature measurement range of great importance for the shipping of pharmaceuticals, e.g. vaccines. Additional embodiments assess temperatures from about −10° C. to about −25° C. Alternative embodiments assess temperatures that range from about 15° C. to about 25° C.

Various products incorporating the present invention address present needs of cold chain shipping in the area of temperature measurement. Additional embodiments of the present invention are equipped to assess measurement parameters including, but not limited to moisture, CO2, oxygen pressure, strain, package integrity, vibration, smart packaging, and other commercially useful applications. The present invention is particularly useful when transporting thermally and physically fragile items.

EXAMPLES

Examples are provided herein to facilitate a more complete understanding of the invention. The examples illustrate the exemplary modes of making and practicing the invention. However, the scope of the invention is not limited to specific embodiments disclosed in these examples, which are for purposes of illustration only, since alternative methods can be utilized to obtain similar results.

Example 1

Phosphor-doped thick polymer films prepared by drop-casting method will luminesce with high brightness and preserve the same temperature-dependence of the emission as the neat phosphor powder. However, there will be some cases for which a thick film will not be suitable. Thermal equilibration with the substrate to which it adheres can be a problem in high heat flux situations, such as, for example, when there is a large temperature difference with the surrounding environment. In such instances, heat transfer and conduction issues are of greater importance. Thinner films as thermographic sensors address these issues. As described below, the present invention includes the extension of $La_2O_2S$:Eu phosphor-doped polymer materials to much thinner films, between 0.1 and 0.4 mm, created by means of spin-coating technology. The results described here cover dopant concentration levels ranging from 5 to 50 wt %. For this investigation, either a 365 nm LED or a 405 nm laser diode was used to provide excitation and the $^5D_2$ state near 510 nm was monitored. The excitation/emission behavior was thoroughly characterized from −20 to 75° C. In spite of the thinness of the films created here, the measured signal intensity for different temperatures is sufficient for a number of applications, from aerospace to biomedical research. Given that the signal levels increase as temperature decreases, lower temperature applications such as cold-chain biologistics are suggested.

Thermal measurements involving thermographic phosphors, whether in the form of powder, crystal, or glass, continues to be of interest for a wide range of applications and temperature ranges. The goal of this report is to convey recent results that are part of a larger program aimed at exploring phosphor-doped polymer films for thermal measurements where the polymer chosen for the study comprises a commercially available optically transparent elastomer such as Sylgard 184. Some important issues that are being addressed are as follows: (1) temperature response faithfulness to pure dopant; (2) mechanical properties versus temperature; (3) signal levels versus dopant concentration and thickness; (4) method of fabrication; (5) durability; (6) thermal conductivity; (7) the role of excitation and luminescence scattering in the film; (8) optical and X-Ray excitation; (9) triboluminescence; (10) heat flux.

Previous work with thick films has demonstrated that for the two phosphor types described above, the luminescence behaves the same way as the neat powder. This suggests that chemical reaction between host and dopant is negligible or nonexistent. Also, earlier work demonstrates the applicability of PDMS-doped with phosphor for biomedical applications utilizing optical and X-Ray excitation mechanisms.

The examples described herein involve the testing of materials formed by the spin-coating method. This approach has the advantage of producing samples as thin as 0.1 mm, and beyond, to date. Documented herein is the fabrication and characterization of thin film sensors that consist of a gradient dopant concentration. Specifically, the samples consist of three layers: a doped top layer (doping concentration A), an undoped middle layer (neat Sylgard 184), and another doped layer (doping concentration B) creating the bottom layer of the structure.

Thin multilayer assemblies offer unique features that can (1) address the possible interplay of scattering and absorption (2) establish signal levels for various thicknesses and concentrations, and, (3) developing a heat flux sensor.

Material Preparation

Composite polymer samples containing different concentrations of lanthanum oxysulfide $La_2O_2S$:Eu, 0.1 mol % powder were prepared by combining Sylgard-184 (10:1 base to cross-linker ratio) with $La_2O_2S$:Eu powder acquired from Phosphor Technology SKL63, lot 15010. Appropriate amounts of $La_2O_2S$:Eu were added to the polymer mix gradually, prior to out gassing and curing to create 5%, 10%, 15% and 20% wt. $La_2O_2S$:Eu concentration samples. The slurry was mixed vigorously and thoroughly for 2 min and then out-gassed in a Precision 3-M vacuum oven at room temperature. No anti-clumping agents were used in this study, but can be used, as necessary. The slurry was dispensed onto a sacrificial layer (rimless aluminium pans) supported on the vacuum chuck of a Chemat Scientific spincoater and then spun at 1000, 1500, and 2000 rpm for each concentration, for 18 sec (optimized experimentally). All samples were placed in the oven on a flat surface and cured at 100° C. for 1 hr. After the samples were cooled down to room temperature, the cured samples were carefully peeled away from the sacrificial support layer. The "sandwich" structures were prepared by spincoating and curing each layer individually and then preparing the next layer after complete curing of the previous layer. Sample thickness was determined by placing each film between two 1 mm thick microscope slides and measuring total thickness 3 times with a caliper. The film thickness was calculated by subtracting the thickness of the slides from the total value measured and taking the average of the three measurements. FIG. 1 shows an enlarged schematic diagram of the layer structure created for this study. FIG. 2 provides a view of a sensor film with phosphor doping. In one embodiment, the sensor film comprises 5% phosphor doping on top 112 and 20% on the bottom 116.

TABLE

Thickness measurement of different samples:

| Name of the Sample | Thickness (mm) (average of 5 measurements) |
|---|---|
| 15-Pure-5% | 0.17 |
| 15-Pure-10% | 0.16 |
| 5-Pure-20% | 0.17 |

Experimental Setup and Results

This initial testing of these material samples involved the setup shown in FIG. 3. The three samples were placed side-by-side on an Instec HCP 302 Hot & Cold plate which is connected to a model mK1000 High Precision Temperature Controller. Control resolution and precision is specified at 0.001° C. A pulse generator (BNC Model 575) drives a 365 nm LED. The LED output is collected and gently focused with a 38 mm focal length lens. A Hamamatsu photomultiplier (PMT) with two 510 nm optical bandpass filters is situated directly above a sample at about 150 mm. The signal is displayed and digitized by a Tektronix 2012 C oscilloscope. A laptop receives and stores the data for subsequent analysis.

Figure 4:
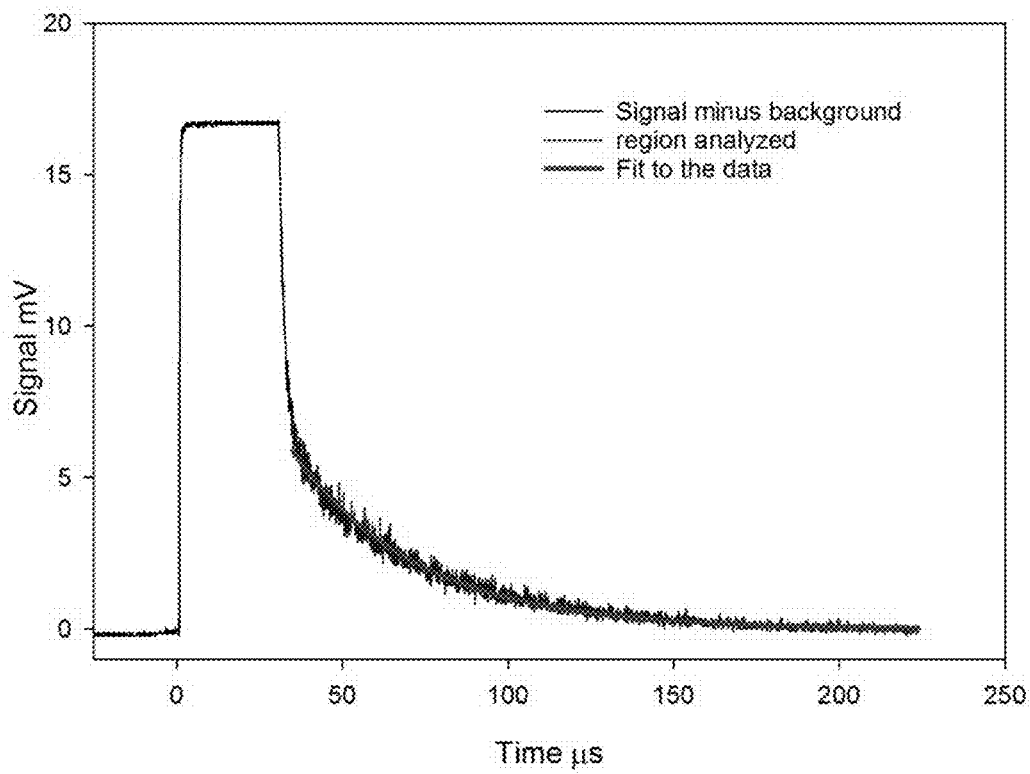
FIG. 4 shows a signal and fit to the waveform obtained from use of the FIG. 3 arrangement.

In order not to disturb the mechanical fixtures holding the LED and PMT, the plate with the samples was moved underneath the PMT. As a result, the illumination and collection geometry was held constant, allowing the intensity of different samples to be compared, simultaneously. FIG. 4 shows a representative signal at −0.5° C. where the top layer consisted of a 5% and bottom a 15% concentration layer. The excitation LED pulse was set at 30 μs in duration. During the excitation, some LED light leaks through the filter, during that time, the signal is off scale. When the excitation pulse terminates, the fluorescence decay becomes evident. The signal beginning at five microseconds after the LED termination is analyzed to determine the decay time. This is the more scattered and noisy, red portion of the plot. EMCO analysis software[6] determined the decay time to be 37.4 μs. The thicker trace in the middle of the noise is the result of the fit.

Figure 5:
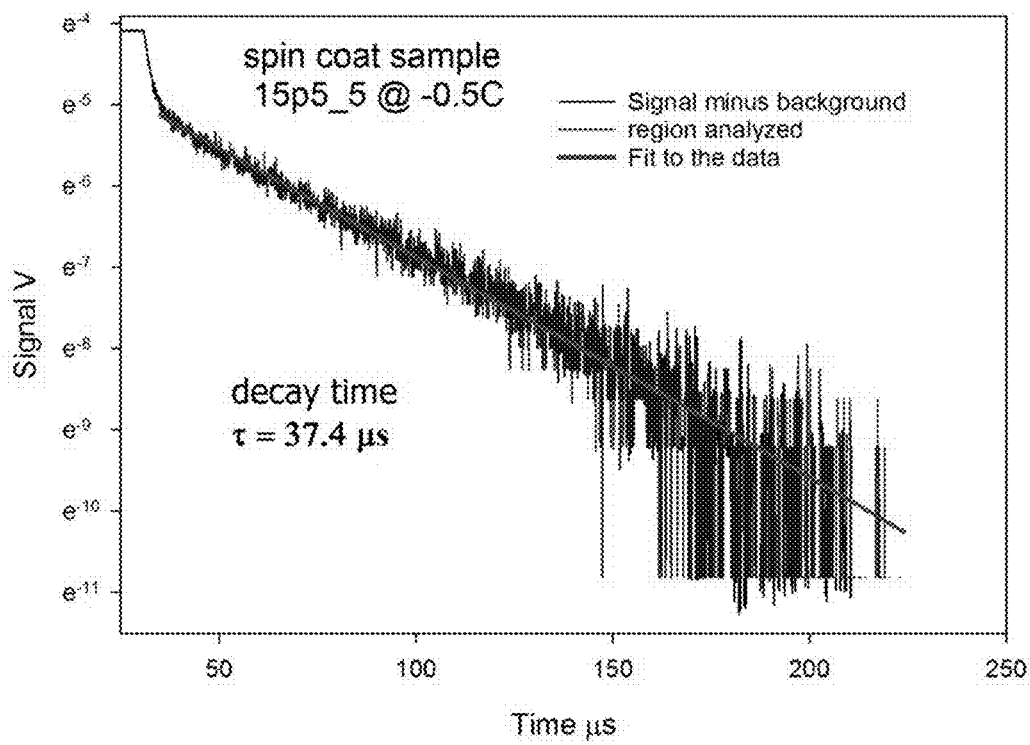
FIG. 5 shows a plot of the natural log of the signal from FIG. 4.

In working with phosphor thermometry signals, it is always a good practice to examine a semilog plot of the signal. Visually it allows the observer to see if the data follows a straight line. If so, then it comports with establishing single exponential decay. There can be several causes for it not being that way such as spurious background emission or detector nonlinearity. It may also indicate the emission does not in fact follow a single exponential response. The data of FIG. 4 is depicted in FIG. 5 where the natural log of the signal and its fit are seen. The region analyzed with noise taken into account appears to correlate with an assumption of a straight line. Another important implication of these data is that the temperature gradient within the sample may be negligible.

Figure 6:
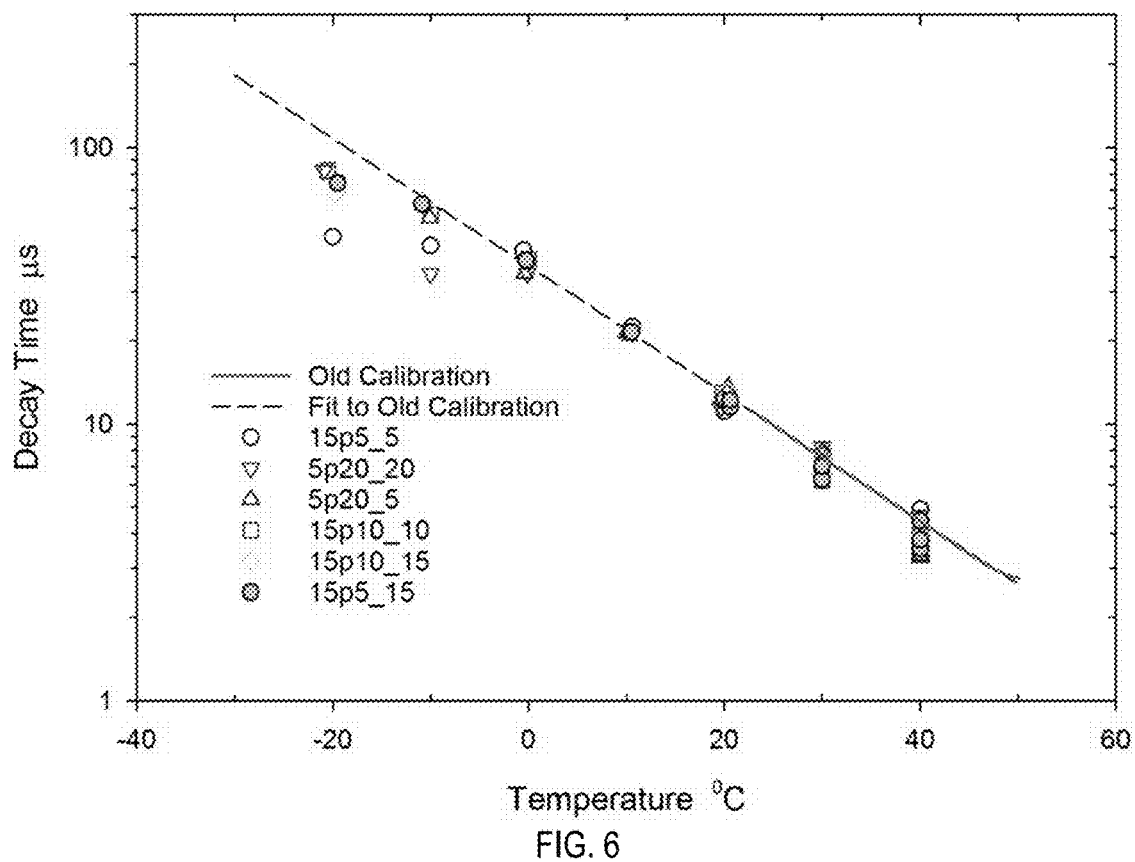
FIG. 6 shows a plot of decay time versus temperature for three embodiments.

FIG. 6 shows the results for all the samples over the range of −20 to 40° C. Larger signals are expected as temperature decreases. This results in part because the decay time increases as temperature decreases. This allows the duration of the LED to be increased so that more light is absorbed. However, at the lowest temperatures, −10 and −20° C., condensation may have prevented maintaining good contact with the plate.

This explains a greater scatter in the data at those two lowest temperatures. The data with least scatter is around 0° C. Then as temperature increases so does the scatter and hence uncertainty in the measurement. The solid, straight line in the plot corresponds to the results of a careful calibration performed in 2009 on a different $La_2O_2S$:Eu phosphor powder sample but by the same manufacturer. The fit produced a calibration curve that has consistently matched other results for this phosphor from this manufacturer. The equation for temperature, $T_c$, versus decay time, $\tau$, is $$T_c = -192.41 - 18.86 \ln(\tau)$$

Figure 7:
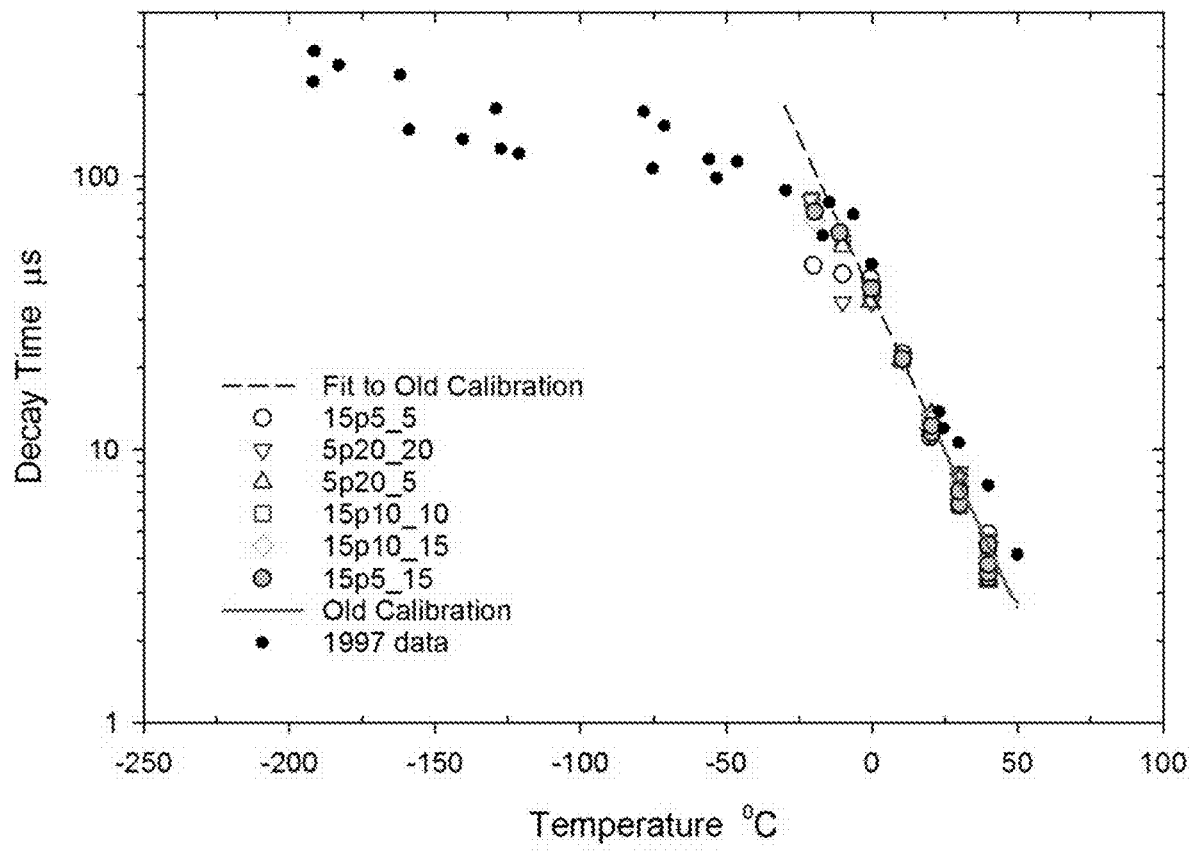
FIG. 7 shows thin film embodiment data compared with historical data.

The dashed line is the extension of that curve to lower temperatures. Overall, the data matches the older calibration from 0 to 40° C. The data at lower temperatures may deviate because of the condensation and poor contact which may lead to shorter decays. However, it is the case with this phosphor that at some lower temperature, the decay will not change as rapidly. A previous publication indicates this leveling off of temperature dependence at lower temperatures (Cates et al., *Rev Sci Instrum.* 1997). Cates provides a plot of decay time versus temperature down to around −200° C. That work involved a different test arrangement including a phosphor from a different manufacturer and excitation via a nitrogen laser, 337 nm. FIG. 7 shows the data of the present work compared to the 1997 data from CateS. It is seen that a change in temperature response occurs close to the lowest temperature achieved and measured for the layered thin samples of the present effort.

Regardless of which side was up or down, signals were, as expected, weaker than either the pure powder or thicker composite samples previously studied. Nonetheless they were sufficient to be useful. One application is in transportation of temperature sensitive freight such as food, pharmaceuticals, or biological material (termed by the shipping industry as Cold Chain and Biologics).

In several additional emdoiments, a means for establishing a temperature gradient is provided, allowing for determination of heat flux. With regard to higher temperatures, the spectrum of this phosphor also includes stronger bands at longer wavelengths that show temperature dependence above 100° C. Thin films can also be fabricated with a different phosphor on top than on the bottom.

Example 2

Noncontact Measurement Demonstration with Foam Box

A hole was made through the wall of a Styrofoam™ container with a 7/64" drill bit that matched the diameter of a test fiber. The fiber was inserted from the inside, FIG. 14. The fiber tip is flush with the box outer surface.

In using the FIG. 14 embodiment, it is fairly easy to point the laser at the fiber and produce the luminescence. The FIG. 14 embodiment utilizes a beam splitter approach to illumination and collection. However, in alternative embodiments, the laser or excitation source can be directly applied to the tip of the fiber optic cable, whiteout being reflected thereon.

FIG. 15 depicts scope traces from the FIG. 14 embodiment wherein the laser pulse duration was 5 ms and repetition rate was 20 pulses per second. It was controlled by the TTL from a pulse generator. Termination into the scope was 50 ohm, and the distance between the dichroic mirror and the fiber tip was about 7 inches.

FIG. 15A shows the signal resulting from a single laser pulse with the overhead fluorescent lamps on. FIG. 15B shows the signal resulting from a single shot with overhead lighting off. The lights produce a dc offset of a little over 100 mV. FIGS. 15C and 15D traces show that averaging 128 signals results in an excellent signal-to-noise ratio. However, with the room lights on (FIG. 15C), there is evidently some 60-cycle modulation of the dc offset. There should be several approaches to eliminating or accounting for this.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art. Those skilled in the art will recognize, or be able to ascertain, using no more than routine experimentation, numerous equivalents to the specific substances and procedures described herein. Such equivalents are considered to be within the scope of this invention, and are covered by the following claims.

What is claimed is:

1. A method for determining a temperature of a packaged material, the method comprising:
    disposing a phosphor-doped sensor film upon a surface of a package, wherein the sensor film comprises at least two layers and at least one of the two layers comprises a phosphor-containing substance embedded within a transparent elastomer;
    subjecting the so-placed phosphor-doped sensor film to an excitation source, causing luminescence of the phosphor-doped sensor film;
    capturing the resultant luminescence via a suitable detector;
    converting the captured luminescence to an electrical analog signal;
    digitizing the analog signal to create a digital signal;
    analyzing the digital signal to assess the temperature of the phosphor-doped sensor film, wherein the assessed temperature indicates the temperature of the packaged material; and
    displaying the assessed temperature to a user.

2. The method of claim 1, wherein the temperature is determined according to a temperature-dependent time decay of the resultant luminescence represented by the following equation:

$$I_0 = I_0 e^{-1/\tau}$$

wherein
$I$ is an instantaneous intensity of the resultant luminescence, $I_0$ is an intensity of the resultant luminescence measured immediately after the sensor film is subjected to the excitation source, t is the temperature, and $\tau$ is a characteristic decay time.

3. The method of claim 1, further comprising an optical bandpass filter that prevents ambient lighting or unwanted luminescence wavelengths from entering the detector.

4. The method of claim 1, wherein the sensor film is less than 0.5 mm thick.

5. The method of claim 1, wherein a phosphor dopant comprises about 5 to about 50 percent of the sensor film weight.

6. The method of claim 1, wherein temperatures are assessed at a range of −20° C. to about 75° C.

7. The method of claim 1, wherein the at least two layers of the sensor film comprises a transparent elastomer.

8. The method of claim 1, wherein the phosphor-doped sensor film comprises europium doped lanthanum oxysulfide ($La_2O_2$ S:Eu).

9. The method of claim 1, wherein the excitation source is a light emitting diode (LED) or a laser diode.

10. The method of claim 1, wherein the phosphor-doped sensor film is disposed inside of the package and the excitation source illuminates the sensor film, the method further comprising at least one fiber optic cable, wherein the at least one fiber optic cable transmits the illumination to the sensor film, captures the emitted luminescence, and conveys the emitted luminescence back to the detector.

11. A kit for determining a temperature of a packaged material, comprising:
    a phosphor-doped sensor film disposed upon a surface of a package, wherein the sensor film comprises at least two layers and at least one of the two layers comprises a phosphor-containing substance embedded within a transparent elastomer;
    an excitation source configured to cause luminescence of the phosphor-doped sensor film;
    a detector configured to capture the luminescence;
    a computing device configured to determine the temperature of the phosphor-doped sensor film based on the captured luminescence, wherein the determined temperature indicates the temperature of the packaged material; and
    a display configured to present the determined temperature to a user.

12. The kit of claim 11, further comprising an optical bandpass filter configured to prevent ambient lighting or unwanted luminescence wavelengths from entering the detector.

13. The kit of claim 11, wherein the sensor film is less than 0.5 mm thick and the at least two layers comprises a transparent elastomer.

14. The kit of claim 11, wherein a phosphor dopant comprises about 5 to about 50 percent of the sensor film weight.

15. The kit of claim 11, wherein the phosphor-doped sensor film is disposed inside of the package and the excitation source is configured to illuminate the sensor film, the kit further comprising at least one fiber optic cable, further wherein the at least one fiber optic cable is configured to transmit the illumination to the sensor film, capture the emitted luminescence, and convey the emitted luminescence back to the detector.

* * * * *